United States Patent

Godawski

[15] 3,665,288

[45] May 23, 1972

[54] TELEVISION SWEEP TRANSFORMER

[72] Inventor: Theodore J. Godawski, Des Plaines, Ill.

[73] Assignee: Zenith Radio Corporation, Chicago, Ill.

[22] Filed: Sept. 2, 1970

[21] Appl. No.: 68,830

[52] U.S. Cl. .............................321/24, 315/27 XY, 336/69, 336/182

[51] Int. Cl. .............................H01f 15/14

[58] Field of Search .................321/24; 323/48; 336/69, 170, 336/180, 182; 315/27 XY

[56] References Cited

UNITED STATES PATENTS

| | | | |
|---|---|---|---|
| 3,280,363 | 10/1966 | Powell | 336/170 X |
| 734,197 | 7/1903 | Splitdorf | 336/182 |
| 2,825,850 | 3/1958 | Iden | 315/27 XY |
| 2,829,304 | 4/1958 | Massman | 315/27 XY |

*Primary Examiner*—A. D. Pellinen

*Attorney*—Francis W. Crotty and Cornelius J. O'Connor

[57] ABSTRACT

A harmonically tuned horizontal output transformer has the turns of the tertiary winding apportioned between two series connected winding sections in order to reduce its distributed capacitance and leakage inductance. These sections enclose the primary to establish a predetermined coupling therewith such that the leakage inductance of the tertiary resonates its distributed capacitance at the fifth harmonic of the characterizing frequency of the retrace pulse. The retrace pulse and the harmonic algebraically combine to provide a broadly peaked drive pulse for the high voltage rectifier.

6 Claims, 4 Drawing Figures

Patented May 23, 1972 3,665,288

2 Sheets-Sheet 1

Inventor
Theodore J. Godawski

By Cornelius J. O'Connor
Attorney

Inventor
Theodore J. Godawski
By Cornelius J. O'Connor
Attorney

TELEVISION SWEEP TRANSFORMER

BACKGROUND OF THE INVENTION

This invention relates in general to a deflection system for a television receiver and in particular to a harmonically tuned transformer for driving the horizontal deflection system.

A television receiver employs a horizontal deflection system for developing the lateral dimension of the raster formed on the display screen of the receiver's cathode-ray tube, as well as for generating an accelerating potential for the final anode of that tube. The accelerating potential is derived, basically, from the retrace pulse which comprises one-half cycle of the sinusoid induced across the primary of the horizontal output transformer when the scanning current through the horizontal deflection coil is interrupted. The frequency of the retrace pulse is determined, principally by the effective inductances of the transformer and the deflection coil and their associated capacitances. The period of this pulse must, of course, correspond to the time interval allotted for horizontal retrace, i.e., approximately 12.5 to 13 $\mu$sec. In terms of frequency a 12.5 to 13 $\mu$sec. period for a half cycle pulse characterizes a signal having a frequency of approximately 40 KHz.

Conventionally, the retrace pulse is stepped-up by the tertiary winding of horizontal output transformer and applied as a sharply peaked high voltage pulse to the high voltage rectifier. Apart from its intended function the retrace pulse induces a ringing which, if not properly controlled, modulates the video signal to produce a raster distortion which is manifested by alternating light and dark vertical bars at one side of the raster. This ringing is attributable to a shock excitation by the retrace pulse of a resonant circuit comprised of the leakage inductance between the tertiary and primary windings of the output transformer and the distributed capacitance across the leakage inductance.

In addition to raster distortion, ringing can adversely affect the operation of the horizontal output device in tube sets. More particularly, when this ringing appears on the anode of the output tube, and is of sufficient amplitude, it will shift the operating point of the tube on its characteristic curve toward the knee of that curve. This not only reduces the operating efficiency of the tube but can be productive of Barkhausen oscillations.

It has been determined that this ringing can be minimized if the energy in the leakage circuit is reduced substantially to zero at the end of the retrace period. This is achieved by "-tuning" the leakage circuit so that it resonates at an odd harmonic of the characterizing frequency of the retrace pulse and is phased, relative to the retrace pulse, so that the ringing signal passes through zero at approximately the same time as the retrace pulse.

In this regard it is a common practice to tune the leakage circuit to the third harmonic of the retrace and to combine this harmonic with the stepped-up retrace pulse developed across the tertiary to derive a narrow sharply peaked high voltage pulse for driving the high voltage rectifier. However, a high voltage circuit driven by a sharply peaked pulse will, under a high brightness load condition, exhibit poor regulation. This obtains because of the relatively short conduction period of the rectifier which, in turn, is attributable to the narrow width of the applied high voltage pulse.

In order to tune an output transformer to a higher harmonic of the retrace, for example, the fifth, the parameters which affect leakage and distributed capacitance of the ringing circuit must be carefully controlled since those parameters are the factors which determine the highest frequency to which the ringing circuit can be tuned. To achieve a high voltage step-up from the primary to the tertiary it is conventional to provide the tertiary with a large number of turns and, to prevent voltage breakdown between the primary and the high potential terminal of the tertiary, the prior art resorts to a "pancake" coil construction, that is, a narrow coil having a large number of winding layers. This construction, however, causes an increase in leakage inductance because of the physical spacing of the outer turns of the tertiary from the primary. Leakage, of course, exists when all of the flux produced by the primary does not link all the turns of the tertiary. Additionally, since the distributed capacitance of a coil is proportional to the mean length of the winding turns, the distributed capacitance of a pancake coil becomes objectionably high since the mean length of the turns increases as the winding progresses outward. However, if it is required that the ringing circuit be tunable to the higher harmonics of the retrace pulse, it is necessary that the tertiary exhibit low leakage and distributed capacitance.

A prior art approach for controlling the leakage inductance of a pancake tertiary advocates mounting the tertiary eccentrically relative to the primary winding, see U.S. Pat. No. 3,132,284. An expedient for reducing distributed and stray capacitance of the tertiary is found in U.S. Pat. No. 3,143,686, which involves recourse to a transformer core having a reduced cross-section in the core leg that supports the tertiary winding. This arrangement further requires that a portion of the primary winding be wound upon the reduced section of the leg and the remainder of the winding wound upon a different core leg. However, these approaches do not provide acceptable tuning of the ringing circuit at frequencies higher than the third harmonic.

In present day television receivers, particularly large screen color sets, high voltage generating circuits capable of delivering accelerating potentials up to 25 Kv are required. In order to maintain proper brightness, focus and size of the reproduced image, voltage regulating circuits are included in the high voltage generating circuit. Moreover, the accelerating potential must be prevented from rising to a level productive of excessive X-ray emissions in the event the regulating circuit fails.

SUMMARY OF THE INVENTION

It is therefore an object of the invention to provide an improved harmonically tuned horizontal output transformer.

It is a specific object of the invention to provide a harmonically tuned horizontal output transformer in which the tertiary winding is characterized by low leakage inductance and minimal distributed capacitance.

It is another object of the invention to provide an improved horizontal output transformer for driving a high voltage generating circuit.

It is still another object of the invention to provide a horizontal output transformer which eliminates the shortcomings of the prior art tuned transformers.

A transformer for use in a television deflection system which has a high voltage generating circuit comprising a rectifier and also an energizing circuit comprises a closed core of magnetic material and a primary winding which encloses a portion of that core. In response to energization of the deflection system, the primary develops a deflection signal which includes a peaked retrace pulse having a predetermined characterizing frequency. A tertiary winding physically encloses the primary and comprises a multiplicity of turns which are apportioned between a plurality of spaced apart series connected winding sections in order to effect a minimal distributed capacitance between the tertiary turns and to reduce the leakage inductance of the tertiary. In response to energization by the primary the tertiary develops a stepped-up replica of the peaked retrace pulse which replica is coupled from an output terminal of the tertiary to the high voltage rectifier. Finally, spacer means are provided for establishing a predetermined coupling between the primary and tertiary in order to tune the leakage inductance of the tertiary to resonate the capacitance across the tertiary, thereby developing, across the leakage inductance, an alternating signal having a frequency which is the fifth harmonic of the characterizing frequency of the retrace pulse. This alternating signal is algebraically combined with the peaked retrace pulse replica to derive a broad peak high voltage pulse for application to the high voltage rectifier to increase its conduction period and thereby improve the regulation of the high voltage generating circuit.

BRIEF DESCRIPTION OF THE DRAWINGS

The features of the present invention which are believed to be novel are set forth with particularly in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figures 1, 4:
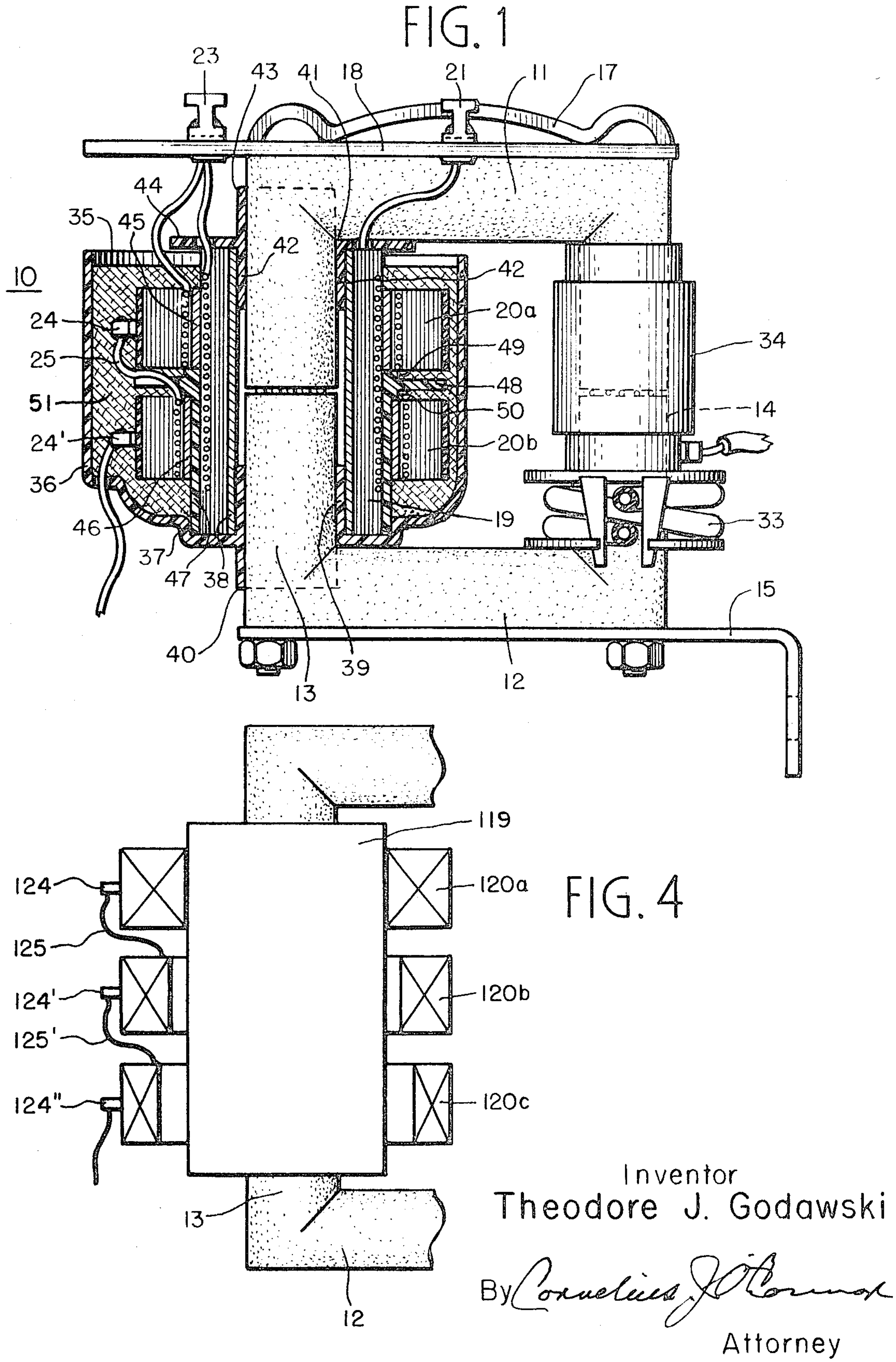
FIG. 1 is a side view, partly in section, of a horizontal sweep transformer constructed in accordance with the invention.
FIG. 4 is a side view, partly in section, of an alternate embodiment of a sweep transformer constructed in accordance with the invention.

The transformer 10 shown in FIG. 1 finds particular application in the horizontal deflection system of a television receiver and to that end comprises a pair of C-shaped cores of magnetic material arranged in an abutting relation to form a closed magnetic circuit having, as viewed in FIG. 1, a pair of horizontally disposed legs, 11, 12 and a pair of vertically oriented legs 13, 14. The cores are secured to a transformer mounting bracket 15 by a U-shaped clamp 17. A terminal board 18, which supports a plurality of terminals, is mounted between core leg 11 and clamp 17. To preclude saturation of the core a nonmagnetic gap is provided in each of core legs 11, 12. These gaps are established by a plurality of glass balls which, together with a quantity of a silicone grease, are applied to the confronting faces of the core legs prior to their assembly to base 15.

Figure 2:
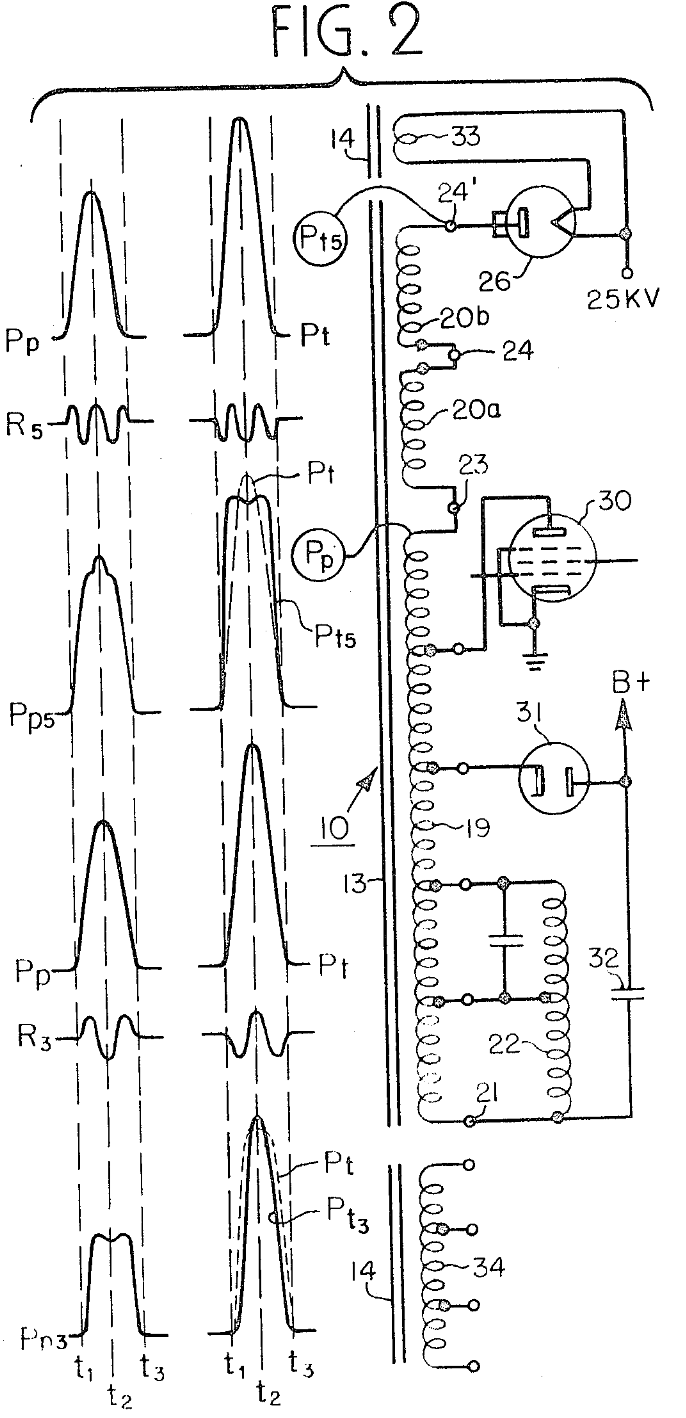
FIG. 2 is a schematic representation of the sweep transformer of FIG. 1 and including portions of a horizontal deflection circuit.

The windings of transformer 10 include a primary 19 which encloses a portion of core leg 13 and a tertiary winding which, in turn, physically encloses the primary. The tertiary comprises a multiplicity of turns which are apportioned between a pair of spaced apart series connected winding sections 20*a*, 20*b*. By dividing the tertiary in this fashion, a minimal distributed capacitance between turns is effected since, in comparison to the conventional pancake tertiary, the mean length of the winding turns is substantially smaller. Moreover, the leakage inductance is significantly reduced by virtue of the fact that, in the disclosed construction, the outer turns of sections 20*a* and 20*b* are more tightly coupled to the primary than are the outer turns in a pancake tertiary. Preferably, primary 19 is wound in autotransformer fashion, as schematically illustrated in FIG. 2, with a plurality of taps therealong having assigned breakout leads. In order to avoid cluttering the drawing only the leads connected to the primary and tertiary turns which are germane to the invention are illustrated in FIG. 1. Thus, a lead serves to connect the inner or start turn of primary 19 to a terminal 21 from whence it is connected to the low potential end of the horizontal deflection coil 22 by another conductor (see FIG. 2). Another pair of breakout leads serve to connect the outer or finish turn of primary 19 and the start turn of tertiary section 20*a* to the terminal 23. The finish turn of tertiary section 20*a* is provided with a terminal 24 which is connected to the start turn of tertiary section 20*b* by the conductor 25. The finish turn of tertiary section 20*b* is terminated by an output terminal 24′ which, in turn, is connected to the anode of a high voltage rectifier 26 (see FIG. 2).

As shown in the schematic diagram of FIG. 2 additional breakout leads effect connections from primary 19 to the anode of the horizontal output tube 30, to the cathode of the damper diode 31, to the high potential end of the horizontal deflection coil 22, to the midpoint of the deflection coil and, via B-boost capacitor 32 to the anode of the damper diode 31. Finally, the anode of diode 31 is connected to a source of unidirectional energizing potential, B+.

The sweep transformer 10 also includes a winding 33 for energizing the filament of the high voltage rectifier 26 which winding comprises a few turns of a conductor wound upon a spool that encircles core leg 14. A pulse developing winding 34 is also mounted upon core leg 14 and serves to derive control signals from the sweep transformer for application to the phase detector of the horizontal sweep oscillator, and to the convergence circuits of the receiver.

Attention is now directed to the housing which supports primary 19 and tertiary sections 20*a* and 20*b*. This housing comprises a cup 35 open at one end and having an internal span which is greater than the external diameter of the tertiary sections and an offset chamber 36 for receiving the terminals 24, 24′ affixed to the finish turns of tertiary sections 20*a* and 20*b*. The bottom of chamber 36, that is, the end remote from terminal board 18, is apertured to provide egress for the high voltage output lead connected to tertiary terminal 24′.

The bottom of the cup is contoured to define an annular well 37 that receives one extremity of primary winding 19. Integrally formed from the bottom of the cup is a re-entrant portion in the form of a hollow post 39 which encloses core leg 13 and also serves to receive and support coil form 38 upon which primary 19 is wound. An extension of post 39 comprises a keyway 40 which cooperates with core leg 13 to index cup 35 thereon. A collar 41, located at the open end of the cut, comprises a sleeve 42 which receives the upper end of primary coil form 38 in the same manner as post 39 cooperates with the other end. Collar 41 is also provided with a keying section 43 which serves to index the collar relative to cup 35 and core leg 13. In addition to their support function, post 39 and sleeve 42 are also determinant of the coupling between the primary winding and the core leg in that they establish the physical spacing therebetween. Collar 41 additionally comprises a radially extending shelf 44 which is apertured to afford the transformer breakout leads access to terminal board 18.

Figure 3:
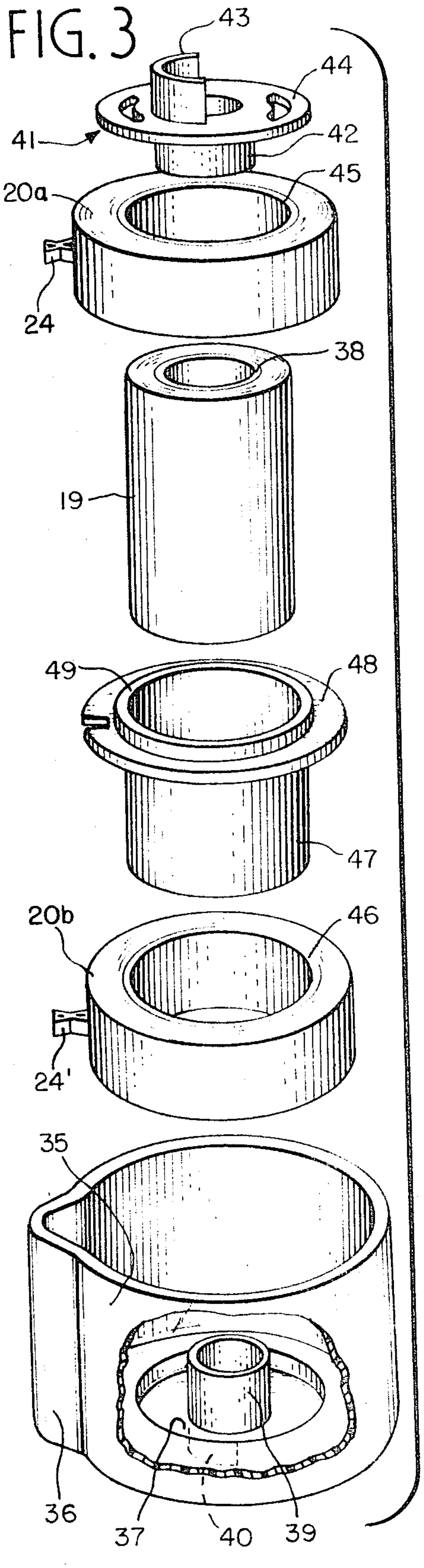
FIG. 3 is an exploded perspective view of the sweep transformer and housing assembly employed in the transformer shown in FIG. 1.

As shown in FIGS. 1 and 3 tertiary section 20*a* is mounted directly upon primary 19 and spaced therefrom by the thickness of its winding form 45. On the other hand the coil form 46 of section 20*b* is mounted upon a bushing 47 which is fitted over primary 19 and which seats against the bottom of well 37. In this arrangement the thickness of coil form 46 and that of bushing 47 collectively establish the spacing of tertiary 20*b* from primary 19, which spacing is greater than the spacing between tertiary section 20*a* and the primary. Bushing 47 is terminated at its upper end by a disc member 48 which serves to prevent high voltage arc over between tertiary sections 20*a* and 20*b*. The portion of disc 48 adjacent cup chamber 36 is radially slotted to accommodate conductor 25.

The overall length of bushing 47 is selected to provide a predetermined spacing for tertiary section 20*a* from the bottom of cup 35. Bushing 47 is further provided with a pair of abutments 49, 50 that establish the axial spacing between sections 20*a* and 20*b*, as well as their positions relative to the turn layers of primary 19. In this regard, see FIG. 1, note that the dimensions of bushing 47 and its abutments 49, 50 are selected to the end that the width of the turn layers of primary 19 is at least coextensive with, or greater than, the span determined by the combined widths of the turn layers of tertiaries 20*a* and 20*b*. Finally, cup 35 includes a quantity of insulating compound 51 which completely envelopes primary 19, tertiaries 20*a*, 20*b*, and terminals 24, 24′.

Insofar as assembly of transformer 10 is concerned, an initial step contemplates positioning tertiary section 20*a* upon primary 19 such that one end of the tertiary turns layers substantially coincides with one end, the upper end as viewed in FIG. 1, of the primary's turns layers. Then bushing 47, upon which tertiary section 20*b* has been previously positioned adjacent abutment 50, is fitted over the opposite end of the primary with abutment 49 of the bushing against tertiary section 20*a*. As a result section 20*b* bears the same physical relation to the primary as does section 20*a*, that is, one end of the turns layers of of tertiary 20*b* coincides with the opposite or lower end of the primary turns layers. Conductor 25 is then connected between the start turn of tertiary section 20*b* and terminal 24 of section 20*a*. At this time the sleeve 42 of collar 41 is inserted in coil form 38 of the primary and the several breakout leads from the transformer are passed through the apertures provided in shelf 44 of the collar. After making the necessary connections to terminal board 18 the cup is slipped over the primary and tertiary assembly and the output lead to the high voltage rectifier 26 is passed through the aperture in the bottom of chamber 36 to effect a connection with tertiary terminal 24'. Windings 33 and 34 are fitted to the other core section and the clamp 17 is secured to bracket 15 to complete the mechanical assembly. Thereafter, the cup is filled with the potting compound and the unit is then heated to set up the compound.

Insofar as the operation of a horizontal deflection system employing transformer 10 is concerned, such a system, upon energization, generates a sawtooth deflection signal having a trace component and a retrace component. More particularly, upon application of a drive signal to the control grid of output tube 30, that device is rendered alternately conductive and nonconductive to energize transformer 10. In known fashion the transformer, tube 30 and damper diode 31 collectively cause a sawtooth sweep current to flow through deflection coil 22. At the completion of the positive trace portion, time $t_1$, the output tube is switched off and the sweep current energy is transferred to the capacitance of the deflection system. Simultaneously a peaked retrace pulse $P_p$ is developed across primary 19 while a stepped-up replica, $P_t$, is developed across the tertiary. After retrace pulse $P_p$ peaks, time $t_2$, the charge in the system capacity flows back into the transformer. At the completion of its positive excursion, $t_3$, the retrace pulse is prevented from swinging negative by virtue of the damping action of diode 31. The period of this half cycle, 12.5 to 12 $\mu$sec., characterizes the retrace pulses as a signal of approximately 40 KHz. The transformer then drives the sweep current through the deflection coil in a reverse direction via diode 31. This reverse current decays linearly from a negative peak, to zero, to complete the scanning cycle.

As previously noted, a high frequency ringing signal R, attributable to shock excitation of a leakage inductance by the retrace pulse is induced and superimposed upon retrace pulse $P_p$, as well as upon tertiary pulse $P_t$, when the output tube 30 is switched off. In order to clarify the manner in which sweep transformer 10 functions to attain its objectives, a series of waveforms depicting the phasal relationships of third harmonic ringing signals $R_3$ to the primary retrace pulse $P_p$ and the tertiary pulse $P_t$, as well as the phasal relationships of fifth harmonic signals $R_5$ to those pulses, are included in the drawing of FIG. 2. In each instance the resultant obtained by combining the ringing signal with a retrace or tertiary pulse is displayed immediately beneath the ringing signal.

In designing the physical dimensions of the primary, the tertiary and their supporting and spacer elements, the spacing between the primary and the core, and the spacing between the two tertiary sections and the primary are selected to achieve the requisite inductive and capacitive coupling between the primary and the tertiary so that the leakage inductance of the tertiary and its capacitance resonate at the fifth harmonic of the retrace pulse frequency, approximately 200 KHz. In practice, the primary and tertiary pulses are observed on an oscilloscope while the spacing between tertiaries 20*a* and 20*b* and primary 19, as well as the spacing between the tertiaries themselves, are adjusted. When the fifth harmonic component $R_5$ is superimposed upon the stepped-up replica $P_t$ of the retrace pulse in an additive and properly phased relation, the resultant tertiary pulse, as exemplified by waveform $P_{t5}$, will be found to have a substantially broadened peak in comparison to tertiary pulse $P_t$. Moreover, this combining of the fifth harmonic with the retrace also adds energy to the tertiary pulse. Utilizing this broadened pulse for driving high voltage rectifier 26 substantially improves the regulation of the high voltage generating circuit since the conduction period of the rectifier is now substantially longer than that which obtains when a narrow width high voltage pulse from a non-tuned tertiary is employed, for example, pulse $P_t$. Similarly, since the tertiary pulse $P_{t3}$ derived in a third harmonic tuned transformer would also produce a narrow width pulse it would also cause the high voltage circuit to exhibit poor regulation under high brightness conditions. By way of emphasis, absent the contribution of the fifth harmonic, the tertiary pulses at terminal 24' would have the waveform $P_t$, in the case of an untuned transformer, or the waveform $P_{t3}$ for a third harmonic tuned transformer, shown by the dotted line constructions in FIG. 2.

Finally, a very important feature of the invention resides in the fact that the broadened tertiary pulse afforded by the disclosed transformer construction serves to reduce the peak voltage to which the output of the high voltage circuit can rise in the event the high voltage regulating circuit fails. This feature is attributable to the fact that the broadened tertiary pulse $P_{t5}$ causes the high voltage rectifier to conduct for a longer period of time than it would in a third harmonic tuned arrangement, or even in an untuned system. With this longer conduction period the impedance of the high voltage circuit is significantly lower than it would be if driven by either an untuned or a third harmonic tuned transformer. As a result, the output of the high voltage circuit will not rise to an undesired amplitude in the event of regulator failure. Laboratory measurements have verified that when the regulator circuit for a high voltage circuit driven by transformer 10 is disabled, the output voltage of the circuit will rise from 25 KV to approximately 31 KV. On the other hand, when the regulator associated with a third harmonic tuned transformer was disabled, the output voltage of that high voltage circuit rose to approximately 39 KV. Accordingly, transformer 10, by virtue of the broadened tertiary pulse it is capable of delivering, provides a limitation on the output of the high voltage circuit in the event of regulator loss, a very important feature in the matter of preventing potential X-ray radiation.

An actual embodiment of the invention that was constructed and operated had the following dimensions and characteristics which are set forth below. However, it should be noted that such dimensions and parameters are disclosed only for purpose of illustration and are not intended, in any sense, to constitute a limitation of the invention:

| | Primary **19** | Tertiary **20***a* | Tertiary **20B** |
|---|---|---|---|
| Turns | 606 | **830** | **710** |
| Wire size | 029Bifilar | 036 | **036** |
| Winding Width | 1 9/16" | **3/16"** | **3/16"** |
| Max. Turns/Layer | 58 | **20** | **20** |
| Layers | 12 | **41½** | **35½** |
| I.D. of Coil | ¾" | **1¼"** | **1 7/16"** |
| O.D. of Coil | 1¼" | **2⅜"** | **2⅜"** |

DESCRIPTION OF AN ALTERNATE EMBODIMENT

It is appreciated, of course, that a sweep transformer constructed in accordance with the teaching of the invention can comprise more than two tertiary sections. For example, a transformer 10' comprising three tertiary sections arranged in the manner shown in FIG. 4 has been constructed and successfully operated. Briefly, transformer 10' comprises a primary 119, and the tertiaries 120*a*, 120*b* and 120*c* having respective terminals 124, 124' and 124'' and arranged in a series relation by the conductors 125, 125'. Other significant parameters of the FIG. 4 embodiment are set forth below:

| Prim. **119** | Tert. **120***a* | Tert. **120***b* | Tert. **120***c* |
|---|---|---|---|

| | | | | |
|---|---|---|---|---|
| Turns | 490 | 680 | 560 | 440 |
| Wire Size | 029 Bifilar | 035 | 035 | 035 |
| Winding Width | 1 9/16" | 5/32" | 5/32" | 5/32" |
| Max. Turns/layer | 58 | 20 | 20 | 20 |
| Layers | 10 | 34 | 28 | 22 |
| I.D. of Coil | ¾" | 1 3/16" | 1⅝" | 1 9/16" |
| O.D. of Coil | 1 3/16" | 2 3/16" | 2 3/16" | 2 3/16" |

CONCLUSION

In summary, there has been shown and described a horizontal sweep transformer which utilizes a multi-section tertiary winding for effecting a minimal distributed capacitance and reduced leakage inductance which arrangement permits derivation of a fifth harmonic signal for combination with a replica of the retrace pulse to derive a broad peak high voltage pulse for driving an associated high voltage generating circuit.

While particular embodiments of the invention have been shown and described, modifications may be made, and it is intended in the appended claims to cover all such modifications as may fall within the true spirit and scope of the invention.

I claim:

1. In a television receiver having a deflection system which includes an associated high voltage generating circuit comprising a rectifier and which also includes an energizing circuit, a transformer for use in said deflection system comprising:

a closed core of magnetic material;

a primary winding enclosing a portion of said core for developing, in response to energization of said deflection system, a deflection signal which includes a peaked retrace pulse having a predetermined characterizing frequency;

a tertiary winding physically enclosing said primary winding and comprising a multiplicity of turns apportioned between a plurality of spaced apart series connected winding sections for effecting a minimal distributed capacitance between the turns of said tertiary winding and for reducing the leakage inductance of said tertiary winding;

and said tertiary winding serving to develop, in response to energization by said primary winding, a stepped-up replica of said peaked retrace pulse;

means for coupling an output terminal of said tertiary winding to said rectifier of said high voltage generating circuit; and spacer means interposed between said tertiary sections and between said tertiary sections and said primary winding for establishing a predetermined coupling between said primary and said tertiary winding to tune the leakage inductance of said tertiary winding to resonate the effective capacitance across said tertiary winding to develop across said tertiary leakage inductance an alternating signal having a frequency which is the fifth harmonic of the characterizing frequency of said retrace pulse for algebraic combination with said peaked retrace pulse replica to derive a high voltage pulse having a broadened peak, relative to said pulse replica, at said tertiary output terminal for application to said high voltage generating circuit to increase the conduction period of said rectifier and thereby improve the regulation of said high voltage generating circuit.

2. A transformer as set forth in claim 1 in which said tertiary winding comprises two sections and in which the width of the turn layers of said primary is at least co-extensive with the combined widths of the turn layers of said tertiary sections.

3. A transformer as set forth in claim 2 in which said tertiary winding comprises n turns and said first section comprises approximately 0.54 $n$ turns and said second section comprises approximately 0.46 $n$ turns.

4. A transformer as set forth in claim 2 in which the spacing between said primary winding and said second tertiary section is greater than the spacing between said primary winding and said first tertiary section.

5. A transformer as set forth in claim 2 in which the finish turn of said primary winding is electrically connected to the start turn of said first tertiary section and said finish turn of said first tertiary section is conductively connected to the start turn of said second tertiary section.

6. A transformer as set forth in claim 1 in which said tertiary winding comprises three spaced-apart series connected winding sections.

* * * * *